US006538805B1

(12) United States Patent
Norwood et al.

(10) Patent No.: US 6,538,805 B1
(45) Date of Patent: Mar. 25, 2003

(54) CODOPANT POLYMERS FOR EFFICIENT OPTICAL AMPLIFICATION

(75) Inventors: Robert A. Norwood, West Chester, PA (US); Anthony F. Garito, Radnor, PA (US); Anna Panackal, Philadelphia, PA (US)

(73) Assignee: Photon-X, Inc., Malvern, PA (US)

( * ) Notice: Subject to any disclaimer, the term of this patent is extended or adjusted under 35 U.S.C. 154(b) by 0 days.

(21) Appl. No.: 09/722,821

(22) Filed: Nov. 28, 2000

Related U.S. Application Data

(63) Continuation-in-part of application No. 09/507,582, filed on Feb. 18, 2000, now Pat. No. 6,292,292.
(60) Provisional application No. 60/120,876, filed on Feb. 19, 1999.

(51) Int. Cl.$^7$ .............................. H01S 3/00; C09K 11/08
(52) U.S. Cl. ........................ 359/341.5; 372/6; 501/45; 252/301.4 P
(58) Field of Search ......................... 359/341.5; 372/6; 501/45; 252/301.4 P

(56) References Cited

U.S. PATENT DOCUMENTS

| | | | |
|---|---|---|---|
| 2,346,155 A | 4/1944 | Denison et al. | |
| 3,197,436 A | 7/1965 | Block et al. | |
| 3,275,574 A | 9/1966 | Saraceno et al. | |
| 3,432,532 A | 3/1969 | King | |
| 3,997,853 A | 12/1976 | Morris et al. | |
| 4,037,172 A | 7/1977 | Filipescu et al. | |
| 4,139,342 A | 2/1979 | Sheldrake et al. | |
| 4,225,459 A | 9/1980 | Faulstick et al. | |
| 4,272,733 A | 6/1981 | Walling et al. | |
| RE31,057 E | 10/1982 | Morris et al. | |
| 4,780,877 A | 10/1988 | Snitzer | |
| 4,811,349 A | 3/1989 | Paynet et al. | |
| 4,860,295 A | 8/1989 | Byer et al. | |
| 4,962,995 A | 10/1990 | Andrews et al. | |
| 5,005,175 A | 4/1991 | Desurvire et al. | |
| 5,032,315 A | 7/1991 | Hayden et al. | |
| 5,093,147 A | 3/1992 | Andrus et al. | |
| 5,105,434 A | 4/1992 | Krupke et al. | |
| 5,140,658 A | 8/1992 | Sunshine | |
| 5,282,260 A | 1/1994 | Buchal et al. | |
| 5,287,217 A | 2/1994 | Cockroft | |
| 5,301,054 A | 4/1994 | Huber et al. | |
| 5,338,607 A | 8/1994 | Kawamoto et al. | |
| 5,364,819 A | 11/1994 | Dexter et al. | |
| 5,379,149 A | 1/1995 | Snitzer et al. | |
| 5,524,016 A | 6/1996 | Pappalardo et al. | |
| 5,555,342 A | 9/1996 | Buchal et al. | |
| 5,694,500 A | 12/1997 | Page et al. | |
| 5,726,796 A | 3/1998 | Regener et al. | |
| 5,755,998 A | 5/1998 | Yamazak et al. | |
| 6,292,292 B1 * | 9/2001 | Garito et al. | ................ 359/341 |
| 6,337,944 B1 * | 1/2002 | Hofstraat | ..................... 385/143 |

FOREIGN PATENT DOCUMENTS

| | | |
|---|---|---|
| EP | 0 556 005 A1 | 8/1993 |
| EP | 0 775 673 | 5/1997 |
| EP | 0 989 693 | 3/2000 |
| JP | 59-116149 | 7/1984 |
| JP | 5-238775 | 9/1993 |
| WO | PCT/EP92/02913 | 7/1993 |

OTHER PUBLICATIONS

"Preparation and Fluorescence Properties of Sm–Containing Copolymers," Zhang et al., Department of Materials Science and Engineering, University of Science and Technology of China, Hefe 230026, Oct. 1992, vol. 6, No. 5, pp. 435–438.

(List continued on next page.)

Primary Examiner—Mark Hellner
(74) Attorney, Agent, or Firm—Finnegan, Henderson, Farabow, Garrett & Dunner, L.L.P.

(57) ABSTRACT

In accordance with the invention, the present invention provides for a polymer comprised of a general composition. The polymer has a first rare earth element, a second rare earth element, one of the elements of Group $VI_A$, one of the elements of Group $V_A$, a first fully halogenated organic group, a second fully halogenated organic group. A method of manufacturing the polymer is also disclosed.

35 Claims, 4 Drawing Sheets

OTHER PUBLICATIONS

"Synthesis and Crystal Structures of (Pr[C2H50)2POO]3)n," Huange et al., Chinese Chemical Letters, vol. 3, No. 11. pp. 947–950, 1992.

A Proposal for Positive Cooperativity in Anion–Cation Binding in Yttrium and Lutetium Complexes Based on o–Amino–Substittued Phenolate Ligands on the Way to Coordination Polymers by Self–Assembly. Molecular Structures of [ClLu(OAr)3)Na] (X–ray) and ClY(OAr')3Y(OAr')3Na (X–ray and 89Y–NMR): Hogerheide et al; Inorganic Chemistry, vol. 35, No. 5, 1996, 35, 1185–1194.

Inorganic Coordination Polymer Chromium (III) Tris0phosphinates), Nannelli et al., Technological Center, Pennwalt Corporation , John Wiley & Sons, Inc., 1973, 2691–2701.

"Luminescence and IR Spectroscopy of Europium (III) Complexes with New Organophosphorus Ligands," Bel'tyukova et al., A.V. Bogat–skii Physical Chemistry Institute, Academy of Sciences of the Ukrainian SSr, Institutte of Radio Engineering and Electornic, Academy of Sciences of the USSR. Translated from Koordinatsionnaya Khimiya, vol. 15, No. 6, pp. 848–852, Jun., 1989. Original article submitted Jun. 16, 1987.

"Synthesis, Characterization and Fluorescence Properties of Europium(3+) and terbium (3+) Bipyridyl Complex Containing Ion Polymers," Zhu et al., Polymer Research Institute, Polytechnic of New York, pp. 78–83.

"Synthesis and Optical Properties of New Inorganic Phosphate Matrices," Lou et al., Journal of Sol–Gel Science and Technology, 2, 787–789 (1994).

"Crystal Structure of Tris(dimethoxyphosphato) Lanthanum (III) Coordination Polymer (LaPO2(OCH3)2)3)n," Fu et al., Chines J. Struct. Chem., vol. 13, No. 1, pp. 24–47.

"Synthesis and Properties of Dimethylsulfoxide Compleses," Zinner et al., An. Acad. Brasil. Clinic, (1986) 58 (2), pp. 183–187.

"Synthesis, Characterization and Applications of Rare Earth Metal ion Chelating Polymers," Okamoto et al., Polytechnic Institute of New York, Department of Chemistry and Polymer Research Institute, pp. 425–450.

"Rare–Earth–Metal–Containing Polymers, 5, Synthesis, Characterization, and Fluorescence Properties of Eu3+Polymer Complexes Containing Carboxylbenzoyl and Carboxlnaphthoyl Ligands," Ueba et al., Journal of Polymer Science, Polymer Chemistry Edition, vol. 20, 1271–1278 (1982).

"Rare Earth Metal Containing Polymers, 4, Energy Transfer from Uranyl to Europium Ions in Ionomers," Okamoto et al., Macromolecules, 1981, 14, 807–809.

"Rare Earth Metal Containing Polymers, 3, Characterization of Ion–Containing Polymer Structures Using Rare Earth Metal Fluorescence Probes," Okamoto et al., Macromolecules 1981, 14, 17–22.

"Investigation on the Synthesis and Characterization of Rare Earth Metal–Containing Polymers, II, Fluorescence Properties of Eu3+Polymer Complexes Containing Beta–Diketone Ligand," Ueba et al., Journal of Applied Polymer Science, vol. 25, 2007–2017 (1980).

Synthesis and Characterization of Rare Earth Metal–Cotaining Polymers, I. Fluorescent Properties of Ionomers Containing Dy3+, Er3+, Eu3+, and Sm3+, Banks et al., Journal of Applied Polymer Science, vol. 25, 359–368 (1980).

"Solid Polymers Doped with Rare Earth Metal Compounds, III. Formation and Stability of Macromolecular Complexes Comprising Neodymium Nitrate and Dipivaloylmethane in Poly(Ethylene Oxide)," Twomey et al. Journal of Polymer Science: Part B: Polymer Physics, vol. 32, 551–560 (1984).

"Inorganic Coordination Polymers, XVIII, Observations on Brittle and Flexible Films of [CrOP(CH3)(C6H5)O2OP(C8H17)20])x*" Nannelli et al., Journal of Polymer Science: Polymer Chemistry Edition, vol. 13, 2849–2856 (1975).

"Polymeric Metal Phosphinates," Inorganic Macromolecules Review, 1 (1970) 115–125.

"Solid Polymers Doped with Rare Earth Metal Salts, I, Complex Formation and Morphology in the Neodymium Chloride—Poly (Ethylene Oxide) System," Twomey et al., Journal of Polymer Science: Part B: Polymer Physics, vol. 29, 859–865 (1991).

"Solid Polymers Doped with Rare Earth Metal Salts, II, Thermal Behaviro and Morphology of the Neodymiumm Acetate–Poly(Ethylene Oxide) System," Twomey et al., Journal of Polymer Science: Part B: Polymer Physics, vol. 31, 647–654 (1993).

"A Study of Neodymium–Chelate–Doped Optical Polymer Waveguides," Lin et al., J. Appl. Phys. 79 (6), Mar. 15, 1996, pp. 2868–2874.

"Properties of Some Europium Laser Chelates Derived from Benzoyltrifluoroacetone," Charles et al., J. Inorg. Nucl. Chem., 1966, vol. 28, pp. 3005–3018.

"Spectroscopy of Dy3+ in Ge–Ga–S glas and its suitability for 1.3–um fiber–optical amplifier application," Wei et al., Optics Letters/vol. 19, No. 12/Jun. 15, 1994, pp. 904–905.

"Effects of Chromophore Dissociation on the Optical Properties of Rare–Earth–Doped Polymers," Gao et al., Applied Optics, vol. 37, No. 30/20, Oct. 1998, pp. 7100–7106.

"Systems Evaluation of an ER3+–Doped Planar Waveguide Amplifier," Nykolak et al., IEEE Technology Letters, vol. 5, No. 10, Oct. 1993, pp. 1185–1187.

"Erbium–Doped Glasses for Fiber Amplifiers at 1500 mm," William J. Miniscalco, Journal of Lightwave Technology, vol. 9, No. 2, Feb. 1991, pp. 234–250.

"Effects of Concentration on the Performance of Erbium–Doped Fiber Amplifiers," Myslinski et al., Journal of Lightwave Technology, vol. 15, No. 1, Jan. 1997, pp. 112–120.

"Performance of High Concentrationg ERbium–Doped Fiber Amplifiers," Myslinski et al., IEEE PHotonics Technology Letters, vol. 11, No. 8, Aug. 1999, pp. 973–975.

"All Light Now Fibre Amplifiers and Their Impact on Telecoms," IEE Review, Jan. 1991, pp. 35–39.

"Fibre Amplifier Comes Ashore," Dettmer, IEE Review May 1994.

"The Golden Age of Optical Fiber Amplifiers," Desurvire, Physics Today, Jan. 1994, pp. 20–27.

"Inorganic Coordination Polymers–XIII[1]. The Preparation and Characterization of Some $\mu$—Halo–Bis($\mu$ –Phosphinato)–Chromium(III) Polymers," H.D. Gillman et al., J. inorg. nucl. Chem. 1973, vol. 35, pp. 4053–4059.

Inorganic Coordination Polymers. XI. A New Family of Chromium (III) Bis(phosphinate) Polymers, [Cr(OH)(OPRR'O)$_2$]$_x$, P. Nannelli et al., Journal of Polymer Science: Part A–1, vol. 9, 3027–3038 (1971).

"Disassociation Constants for Polyfluoro of Phosphorus in Various Media," G. Matveeva et al., Akad. Nank, SSR. Ser. Klaim, 1982, 1491, pp. 1329–1335.

* cited by examiner

ENERGY TRANSFER FROM ABSORBER TO CODOPANT EMITTER

TRIS [DIPERFLUOROALKYL] PHOSPHINATO ERBIUM (III) YTTERBIUM (III)

$R_F$ = Perfluoroalkyl

CODOPANT POLYMERS FOR EFFICIENT OPTICAL AMPLIFICATION

CROSS-REFERENCE TO RELATED APPLICATION

The present application is a continuation-in-part of application Ser. No. 09/507,582, filed Feb. 18, 2000, now U.S. Pat. No. 6,292,292 which claims the benefit under 35 U.S.C. §119(e) of provisional application Serial No. 60/120,876 filed Feb. 19, 1999.

STATEMENT REGARDING FEDERALLY FUNDED SPONSORED RESEARCH OR DEVELOPMENT

The U.S. Government has a paid-up license in this invention and the right in limited circumstances to require the patent owner to license others on reasonable terms as provided for by the terms of Contract Nos. N00014-00-M-0029 and N00014-00-C-0117 awarded by the Department of the Navy.

DESCRIPTION OF THE INVENTION

1. Field of the Invention

The present invention relates generally to fiber optics and fiber optic waveguides. In particular, this invention relates to rare earth polymer compositions, for use in optical fibers and optical waveguides.

2. Background of the Invention

As fiber optics are increasingly employed in long distance communications, metropolitan network and local access communications, there is an increasing need for efficient, compact optical amplification.

Optical communication systems based on glass optical fibers (GOFs) allow communication signals to be transmitted not only over long distances with low attenuation but also at extremely high data rates, or bandwidth capacity. This capability arises from the propagation of a single optical signal mode in the low-loss windows of glass located at the near-infrared wavelengths of 0.85, 1.3, and 1.55 $\mu$m. Present technology has moved to erbium doped fused silica fiber for optical amplification. Since the introduction of erbium-doped fiber amplifier (EDFA), the last decade has witnessed the emergence of single-mode GOF as the standard data transmission medium for wide area networks (WANs), especially in terrestrial and transoceanic communication backbones. In addition, the bandwidth performance of single-mode GOF has been vastly enhanced by the development of dense wavelength division multiplexing (DWDM), which can couple up to 160 channels of different wavelengths of light into a single fiber, with each channel carrying gigabits of data per second. Moreover, a signal transmission of 1 terabit ($10^{12}$ bits) per second was achieved over a single fiber on a 100-channel DWDM system. Enabled by these and other technologies, the bandwidth capacities of the communication networks are increasing at rates of as much as an order of magnitude per year.

The success of single-mode GOF in long-haul communication backbones has given rise to the new technology of optical networking. The universal objective is to integrate voice, video, and data streams over all-optical systems as communication signals make their way from WANs down to smaller local area networks (LANs), down to the curb (FTTC), home (FTTH), and finally to the end user by fiber to the desktop (FTTD). Examples are the recent explosion of the Internet and use of the World Wide Web, which are demanding higher bandwidth performance in short- and medium-distance applications. Yet as the optical network nears the end user, starting at the LAN stage the system is characterized by numerous fiber connections, splices, and couplings, especially those associated with splitting of the input signal into numerous channels. All of these introduce optical loss. To compensate for the loss penalty, current solutions rely on expensive EDFAs that are bulky at fiber lengths of about 40 m. The cost of a typical commercial EDFA can reach many tens of thousands of dollars. Thus, to complete the planned build-out for FTTC, and FTTD in the U.S. would require millions of amplifiers and hundreds of billions of dollars.

An EDFA module is made up of a number of components. One of the most critical components in the module is the erbium doped silica fiber (EDF). Present EDF is limited by low concentrations of erbium atoms (maximum is about 0.1%), clustering that leads to quenching of photoluminescence, a relatively narrow emission band, a highly wavelength dependent gain spectrum, and an inability to be fabricated in a compact, planar geometry. Efforts have been directed toward the use of other rare earth ions in both fused silica glass hosts and other glasses including fluoride, tellurite and phosphate glasses. To this point, these efforts have been limited by the fundamental materials properties of these glass media with regard to their ability to dissolve rare earth atoms, mechanical properties, thermal stability, and other key properties.

Certain embodiments of the present invention comprise rare earth fluorphosphinate polymer material that comprise the following preferred properties:

- compatibility with a broad range of rare earths that enable coverage of the full 1500 to 1600 nm window (and beyond) using a common host platform;
- very high concentrations of rare earth elements without associated quenching and upconversion penalties, allowing for short lengths of fiber to be used as small as centimeters and less;
- low intrinsic optical loss;
- capable of being drawn into single mode optical fiber; and
- capable of being cast into films for planar waveguide applications.

Cost effective, compact integrated optics is a solution to this problem, but currently is non-existent. Resulting is the need for very long lengths of this fiber (tens of meters) in actual use. There is a need for an efficient, compact, broadband amplifying medium to accommodate lower power pumping, reduce packaging problems, and increase network capacity.

It would also be beneficial to provide novel optical waveguide materials that are easy to process using standard silicon VLSI (very large scale integration) fabrication methods and optical fiber drawing processes. Further, it would also be beneficial to produce a fiber amplifier and material therefore having low-loss in short and medium distance communications network systems. Additionally, it would be beneficial to produce an integrated optical component that is a low-loss splitter that combines amplification and splitting of the input signal while maintaining a high signal-to-noise ratio.

SUMMARY OF THE INVENTION

In accordance with the invention, the present invention provides for a polymer comprising at least one unit comprising a first rare earth element, a second rare earth element, at least one of the elements of Group VIA, at least one of the elements of Group $V_A$, a first fully halogenated organic group, a second fully halogenated organic group.

In another embodiment of the present invention there is a method of manufacturing a polymer comprising providing a sodium salt of a fully halogenated substituted acid in a first solvent, for example acetone, the sodium salt comprising a general composition and comprising at least one of the elements of Group $VI_A$, at least one of the elements of Group $V_A$, a first fully halogenated organic group, a second fully halogenated organic group, providing a first rare earth chloride in a second solvent, for example, dry acetone, providing a second rare earth chloride in a third solvent, for example dry acetone, combining the sodium salt in the first solvent, the first rare earth chloride in the second solvent, and the second rare earth chloride in the third solvent together to form a mixture, stirring the mixture in an atmosphere, for example under nitrogen, for a predetermined period of time at a predetermined temperature, adding a dilutent, for example distilled water to the mixture, boiling the aqueous solution, filtering the aqueous solution, washing the aqueous solution with a rinsing agent for example, boiling water, forming a washed product, and drying the washed product.

While a first and second rare earth are stated, it is contemplated that the first and second rare earth elements can be the same or different rare earth elements. Additionally, as a first and second fully halogenated organic group are stated, it is contemplated that the first and second fully halogenated organic groups are the same or different fully halogenated organic group.

In certain embodiments of the present invention there is an optical amplifying fiber assembly provided comprising a fiber formed from a first polymer and comprising a first diameter and a first refractive index, having a cladding disposed about an outer perimeter of the fiber, the cladding comprising a second diameter and a second refractive index less than the first refractive index.

In certain embodiments of the present invention there is an optical waveguide provided comprising a substrate, a first cladding layer on the substrate, the first cladding layer comprising a first refractive index. The optical waveguide also comprising a first polymer on the first cladding layer, the first polymer comprising a second refractive index, a plurality of channel waveguides formed in the first polymer, and a second cladding layer over the first polymer, the second cladding layer comprising a third refractive index, the first and third refractive indices being less than the second refractive index.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

DESCRIPTION OF THE PREFERRED EMBODIMENTS

Reference will now be made in detail to embodiments of the invention, examples of which are illustrated in the accompanying drawings. Wherever possible, the same reference numbers will be used throughout the drawings to refer to the same or like parts.

Figure 1:
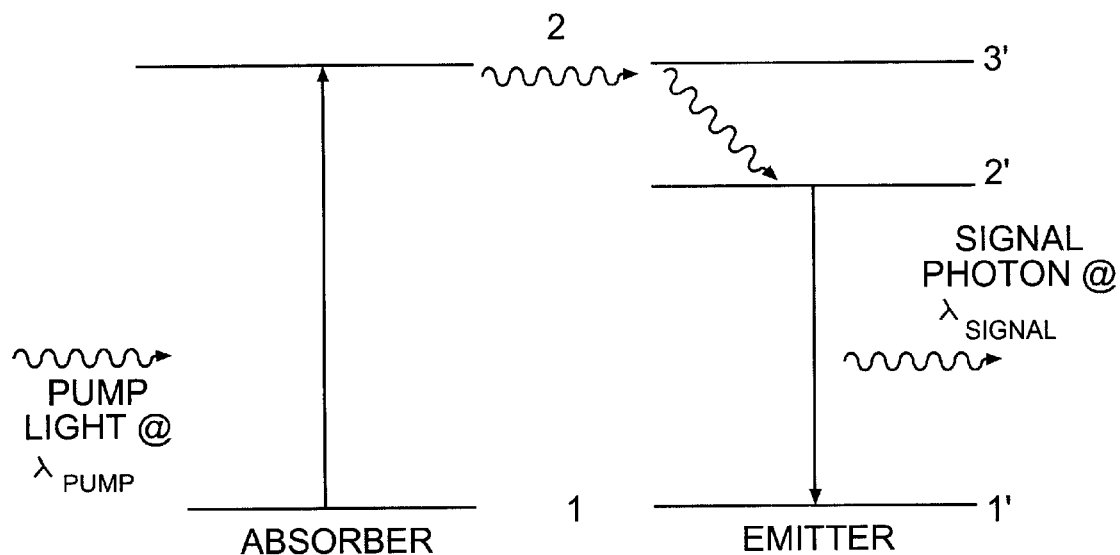
FIG. 1 is an energy level diagram for a rare earth codopant emitter.
Figure 1A:
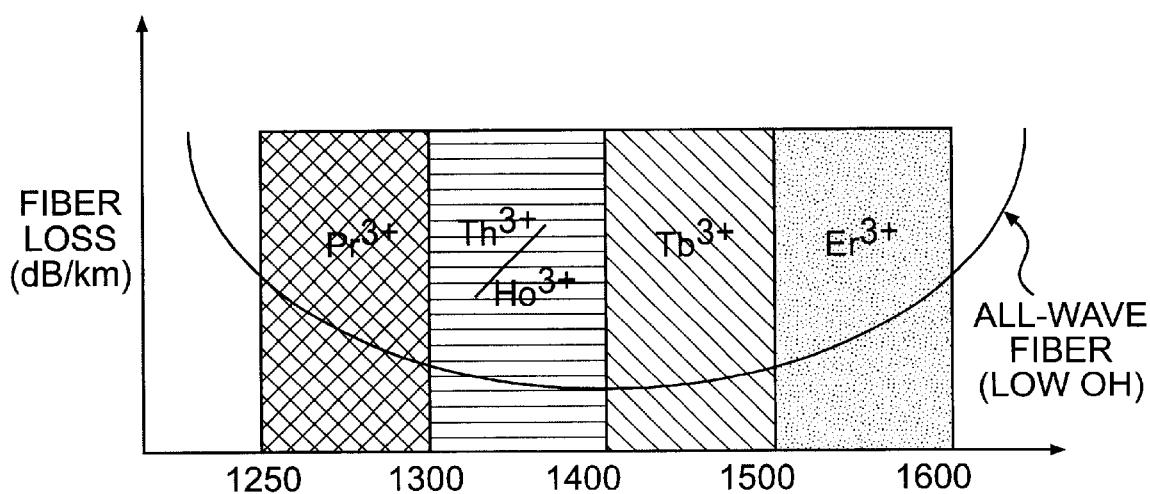
FIG. 1(a) is a diagram of polymer blends for optical amplification.

Rare earth (RE) waveguide amplifiers operate on the basic 3-level and 4-level laser transition principles. The single pass gain of the waveguide amplifier is the fundamental parameter to be calculated. Amplification in a RE polymer waveguide, as with most types of laser systems, can be described with a 3-level model. FIG. 1 displays the energy level diagram of such a model for $Er^{3+}$ ion. FIG. 1(a) shows a diagram of polymer blends for optical amplification.

Referring to FIG. 1, in an amplifier, the RE ions start out in their ground state, level 1. The electrons are then excited to level 2 by a pump beam of photons with energy $h\omega_p$ equal to the transition energy from level 1 to level 2. The ions subsequently undergo fast nonradiative decay to level 3, which is the metastable state of the system. The lifetime of this state is very long in comparison to the nonradiative decay. As a consequence, a population inversion is created in level 3. Then, as a signal beam passes by the ions, it stimulates emission of photons with the same signal energy, $h\omega_s$. This stimulated decay is from level 3 to level 1, the ground state.

The RE ion is encapsulated as a chromophore which has the ability to control the manifold of electronic excited states. In certain embodiments there is an optical energy transfer mechanism between the surrounding organic ligands of the chromophore unit and the central RE ion in which the RE excited state can be populated through selective absorption ("light harvesting") by the chromophore ligand and subsequent energy transfer to, the RE site. This transfer can approach unit efficiency, and, as a result, can increase the absorption cross-section by $10^4$–$10^5$ times that of bare RE ions.

Figure 2:
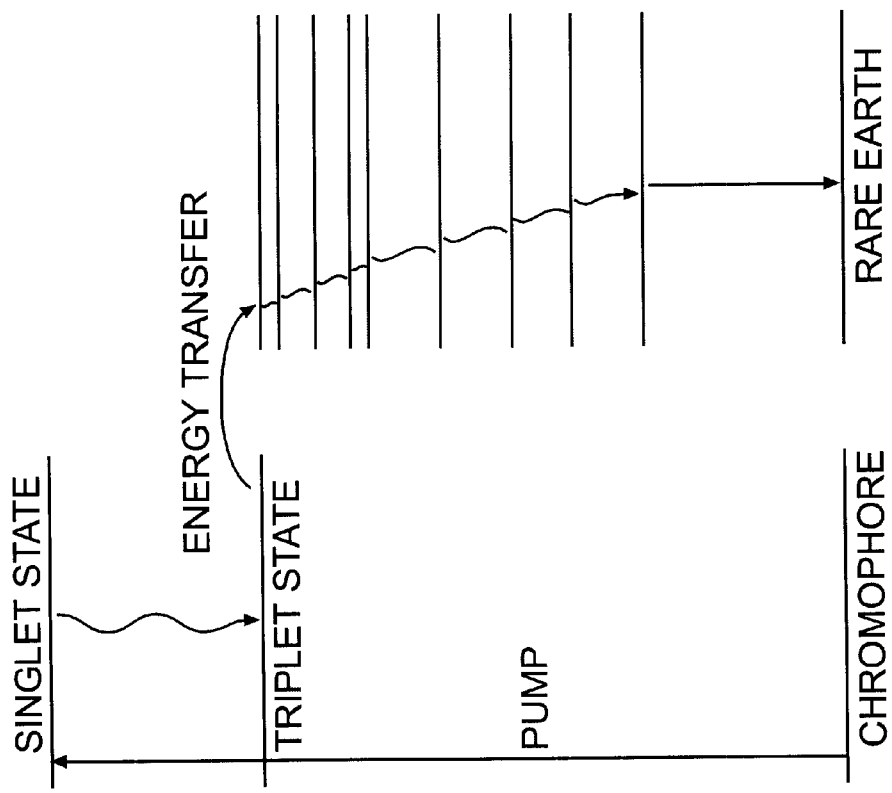
FIG. 2 is an energy level diagram for a rare earth chromophore.

The process is diagrammed in FIG. 2, which shows how the chromophore ligand singlet band is first excited by pump light and then decays nonradiatively through inter-system crossing (IC) to its bottleneck triplet state. Radiative transitions back to the ground state are spin forbidden and, hence, the chromophore ligand can relax through energy transfer to the encapsulated RE ion. This energy transfer is increased by tuning the energy gap, again through chromophore design, between the ligand triplet state and the upper level of RE fluorescing transition.

The optical intensity of the transmitted signal is determined by the optical attenuation coefficient of an optical waveguide. The various factors contributing to optical loss in optical polymers can be divided into intrinsic and extrinsic loss. Intrinsic loss includes vibrational absorption of the polymer materials, electronic transition absorption, and Rayleigh scattering. Extrinsic loss includes absorption due to impurities, scattering from dust and microvoids, and imperfections in fiber parameters. Extrinsic loss is related to materials processing and fiber fabrication, and thus can be reduced by perfecting each procedure. Intrinsic loss is material related and cannot be reduced without drastic changes in material composition.

Standard optical polymer materials are based on hydrocarbon (C—H) structures. A prototypical example is polymethylmethacrylate (PMMA) which has three principal loss windows located at 570, 650, and 780 nm between absorption maxima arising from C-14 vibrational overtone modes. In high optical quality samples, the principal window at 650 nm exhibits a measured minimum loss of 110 dB/km, very close to the theoretical limit of 106 dB/km. Molecular vibrations of aliphatic hydrocarbons in PMMA are the dominant intrinsic loss factor in optical polymer waveguides. The fundamental CH vibration occurs at 3.2 $\mu$m. The attenuation loss in the visible wavelength region is affected mainly by the 5th to 7th high harmonics of CH absorption. At the 650 nm window, CH absorption contributes about 90 dB/km to the total loss. In the near-infrared region, the minimum loss exceeds $10^4$–$10^5$ dB/km, thereby excluding standard optical polymers and RE chromophore structures based on them for use at the three telecommunications wavelengths of 850, 1300, and 1550 nm.

When designing an optical amplifying medium, potential nonradiative decay pathways are considered. In the RE doped medium, the excited rare earth atoms must be prevented from nonradiatively returning to their ground state via coupling to vibrational modes in the surrounding medium. This is most readily accomplished by assuring that vibrational modes present have low energies (for example, less than 1000 cm$^{-1}$). A controlled microscopically engineered method for achieving this is to incorporate at least one rare earth ion in an organic or inorganic polymer that has exclusively low energy vibrations. Since high vibrations are generally caused by the presence of light atoms, the most direct method of achieving this goal is to eliminate light atoms such as hydrogen from the medium. This is accomplished for example in the newly developed rare earth doped perfluoropolymers.

The intensities of the harmonic absorption bands decrease by one order of magnitude with each successive harmonic. If hydrogen is replaced with a more massive atom, the wavelengths of the fundamental vibration and subsequent harmonics shift to longer wavelength regions. The order of higher harmonies which affects the near-infrared region are higher, resulting in significant decreases in vibrational absorption.

Indeed, when the short wavelength O—H and C—H bonds are replaced by C—F bonds having a markedly longer fundamental stretch vibration at 10 $\mu$m, the resulting fluoropolymer waveguide exhibits a reduced loss of 10 dB/km with a practically flat dispersion over the near-infrared range. The primary contributing factors to the fluoropolymer loss are wavelength-independent structural waveguide imperfections and Rayleigh scattering, $\alpha_R = 9.5(568/\lambda)^4$ dB/km, as based on measurements of fluorinated polymer waveguides. Losses attributed to electronic absorption are usually negligible as are absorptions from molecular vibrations. The C—F vibrational overtones are basically minimal in the visible region and have strengths, in the near infrared range, of typically much less than 1 dB/km even up to near 1500 nm. Consequently, the total theoretical loss of a perfluorinated polymer waveguide approaches 10 dB/km well into the near-infrared and is less than 25 dB/km over most of the visible spectrum.

Varieties of fluoropolymers for passive optical waveguides have been developed for direct use, including, for example, ether-, perfluoromethyl-, and chloro-substituted polytetrafluoroethylenes, acrylates, silicones, polyimides, and co- and ter-polymers of polytetrafluoroethylene (PTFE) and polyvinylidene fluoride (PVDF).

The replacement of O—H and C—H bonds with C—F bonds in the polymer fiber waveguide core materials helps over all radiative efficiency of the RE systems. The O—H stretch (~3600 cm$^{-1}$) and C—H stretch (~3200 cm$^{-1}$) vibrations play a dominant role in phonon-assisted, nonradiative removal of electronic excitation energy from excited RE ions. Such nonradiative decay of RE metastable states reduces radiative efficiency and, consequently, degrades amplifier device performance. Phonon-assisted decay decreases exponentially with increased number of phonons required to span the energy gap between the metastable state and the ground state. In the new RE perfluoro polymers, the high frequency O—H and C—H bonds are replaced by C—F bonds that possess considerably reduced frequency vibrations (~1000–1200 cm$^{-1}$), and as a consequence, long metastable(~1–10 ms) lifetimes for the RE sites.

Disclosed is the design and synthesis of two general classes of high optical transparency RE perfluoro polymers for optical amplification applications, see FIG. 2. The basic perfluoro phosphate structure avoids the introduction of O—H and C—H bonds and utilizes C—F bonds. The Er$^{3+}$ ion concentration in these novel polymers is relatively high on the order of $10^{21}$ ions/cm$^3$. Also disclosed is the use of commercially available fluoropolymers for cladding materials with the new RE perfluoro polymers. In addition to Er$^{3+}$, both single, as well as combinations of RE metal ions can be encapsulated at high concentrations in the basic polymer structure.

The radiative properties of the new materials are measured and characterized. The basic structure of these RE chromophores is composed of an isolated single RE ion encapsulated by a molecular "coordination shell." To create such a shell of certain embodiments, perfluorinated organic phosphinate ligands are used with coordinating donor atoms, such as oxygen, to chemically bond to the RE ions which not only isolates the RE ion but also forms a physico-chemical barrier for the RE ion. These RE polymers are compatible with high-temperature perfluorinated polymers suitable as passive cladding materials. RE concentrations of ~$10^{20}$–$10^{21}$ ions/cm$^3$~10% wt RE ion have been achieved with no undesirable effects such as clustering and lifetime quenching. These relatively high concentration figures are to be compared to the 0.1% limit common to silica glasses and inorganic crystals.

The optical properties of the Er$^{3+}$ perfluoro polymers have been evaluated using Judd-Ofelt analyses in order to obtain important radiative lifetimes and emission cross-sections for transitions to the metastable state. In brief, the results for several cm length polymer waveguides are comparable in performance to that of Er$^{3+}$ doped silica glasses commonly used in 40 m length commercial EDFAs. The results provide further basis for the selected approach of RE perfluoro polymer materials.

Optical amplification can be achieved in rare earth doped halogenated polymers as previously described in U.S. patent applications, Ser. No. 09/507,582, filed Feb. 18, 2000 and Ser. No. [Attorney Docket No. 07033.0009] filed on Nov. 28, 2000, which are owned by the assignee of the present invention and are incorporated herein by reference in their entirety.

In an embodiment of the invention there is a rare earth polymer composition comprising,

$$\{X(DDZRR')_3\}n \quad (1)$$

where X comprises at least one rare earth element or aluminum.

In another embodiment the rare earth polymer comprises,

$$\{XY(DDZRR')_3\}n \quad (2)$$

where X and Y can be at least one rare earth element or aluminum, and X and Y may be the same or different.

Another embodiment of the present invention for the rare earth polymer composition comprises,

$$\{XY(OOPRR')_3\}n \quad (3)$$

where X and Y, which are the same or different, are a rare earth element or aluminum. Suitable rare earth elements include lanthanum, cerium, praseodymium, neodymium, promethium, samarium, europium, gadolinium, terbium, dysprosium, holmium, erbium, thulium, ytterbium, and lutetium. All other rare earth element are also within the contemplation of the invention and not intended to be excluded.

For the composition of formulas (1) and (2), D is a Group $VI_A$ element of the periodic table. In an embodiment D can be oxygen or sulfur. Also, for these formulae, Z is a Group $V_A$ element of the periodic table. And in certain embodiments of the invention, Z can be nitrogen or phosphorous.

Typically, R is a fully halogenated organic group, and R' is another fully halogenated organic group which is the same or different from R. R and R' can be fluoroalkyl chains of the formula $C_xF_y$, where y=2x+1, where x≧1 and R=R' or R does not equal R'. In certain embodiments, x is 6 or 8. Generally, n is an integer greater than 1 or can be 1.

Generally, in the first and second fully halogenated organic groups (R and R') the halogens may be fluorine, chlorine, bromine or mixtures thereof. In certain embodiments, the first and second fully halogenated organic group contain fluorine. Another embodiment is a hexafluorophenoxy group having the formula $C_6F_5O$.

Given a rare earth doped polymer, improvements in processing can be realized by blending the polymer with perfluoropolymers including for example, Poly[2,3-(perfluoroalkenyl)perfluorotetrahydrofuran] known by the Trademark CYTOP® (Asashi Glass), Poly[2,2-bistrifluoromethyl-4,5-difluoro-1,3-dioxole-co-tetrafluoroethylene] known by the Trademark Teflon® AF (DuPont), or optionally, with fluoropolymers for example, tetrfluoroethylene/hexafluoropropylene/vinylidene copolymers known as THV® (3M), fluorinated polyimides, fluorinated acrylates, fluorinated methacrylates, fluorinated polyarylethers, or high quality optical polymers such as polymethylmethacrylate, polystyrene, polycarbonate, and norbornene polymers.

The term element used herein is understood to include ions, atoms, isotopes, and species of atoms of the Period Table.

The compositions identified above may be used to produce cores for optical fibers. The cores can be cladded with suitable materials comprising a lower refractive index than the core. The core/cladding refractive index difference may be small enough to result in single optical mode propagation for optical wavelengths from 1200–1700 nm. In certain embodiments, the compositions identified may be used to produce an optical amplifying film, comprising a substrate, a buffer film, a guiding layer, and an upper cladding film, such that the refractive indices of the buffer film and the upper cladding film, are less than that of the guiding layer film, with the resulting waveguide guiding a single optical mode for optical wavelengths from 1200–1700 nm.

The rare earth doped halogenated polymers of certain embodiments can incorporate rare earth atoms in a covalently bonded polymer chain. In certain embodiments deleterious effects such as clustering and upconversion quenching are reduced. Certain embodiments of the present invention involve the use of selected energy transfer rare earth ion codopants that increase the overall absorption for pumping radiation and can transfer that absorbed radiation to rare earth ions that luminesce at wavelengths of interest. These codopants can be incorporated at a continuum of desired levels, providing for more precise control over the ratio of codopant ions to luminescing ions. For a given desired amplifier performance, the copolymer composition can be tuned to optimize the pump radiation absorbed, device length, luminescence efficiency, and nose figure in the amplifier. High percentages of codopant and luminescing rare earth ions can be incorporated (up to 5–15%) leading to very high gains per unit length, resulting from increased pump absorption and/or efficient luminescence. In certain embodiments, the polymer medium provides a broader gain spectrum than glass media, owing to nonhomogeneous broadening, thereby leading directly to a broader band amplifier.

The codopant polymers of some embodiments are made via a condensation type of polymerization in suitable organic solvents for example, lower alkyl ketones, lower alkyl ethers, for example acetone. The sodium salt of a fully halogenated substituted acid, and in certain embodiments, phosphinic acid may be added to a mixture of rare earth chlorides, $XCI_3$ and $YCI_3$ where X and Y are the same or different elements and are chosen from, lanthanum, cerium, praseodymium, neodymium, promethium, samarium, europium, gadolinium, terbium, dysprosium, holmium, erbium, thulium, ytterbium, lutetium and aluminum. The solid that results is stirred under nitrogen for about 72 hours at room temperature. Distilled water is then added to the reaction mixture which is boiled to remove the sodium chloride, and filtered and washed with boiling water repeatedly. The washed product is then dried in a vacuum oven. The resultant polymers, as shown in FIG. 3, are soluble in organic solvents such as dimethyl acetamide and are also high temperature processible.

Figure 3:
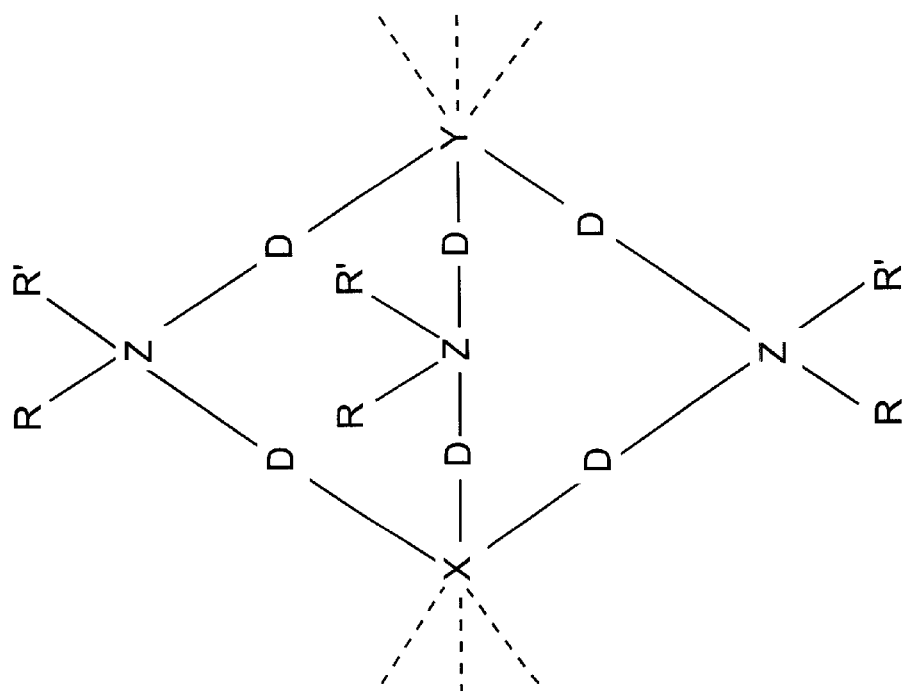
FIG. 3 is a chemical structure of a polymer for optical amplification.

In FIG. 3, X and Y are the same or different and each rare earth element chosen from lanthanum, cerium, praseodymium, neodymium, promethium, samarium, europium, gadolinium, terbium, dysprosium, holmium, erbium, thulium, ytterbium, lutetium and aluminum. In certain embodiments, X and Y are different elements, with a ratio of X:Y often in the range between 1:1 and 1:50, but more preferably, approximately 1:10. Although X and Y are often different elements, those skilled in the art will recognize that X and Y can be the same elements.

Still referring to FIG. 3, D is typically an element from Group $VI_A$ on the Periodic Table. In an embodiment, D is one of oxygen and sulfur. In other embodiments, selenium can also be used. Z is an element from Group $V_A$ on the Periodic Table. In certain embodiments, Z can be phosphorous. Although not as preferred as nitrogen and phosphorous, arsenic can also be used.

Still referring to FIG. 3, R and R' can each be a fully halogenated group. The halogen is one of fluorine, chlorine, bromine, and mixtures thereof. In an alternative embodiment, the first and second halogenated organic group consists of fluorine. More preferably, the halogenated oxygenated group is a fluoroalkyl chains of a general composition $C_mF_{2m+1}$ where $m \geq 1$. Preferably, R equals R', although those skilled in the art will recognize that R can be different from R'. Also, n is an integer greater than 1.

Figure 4:
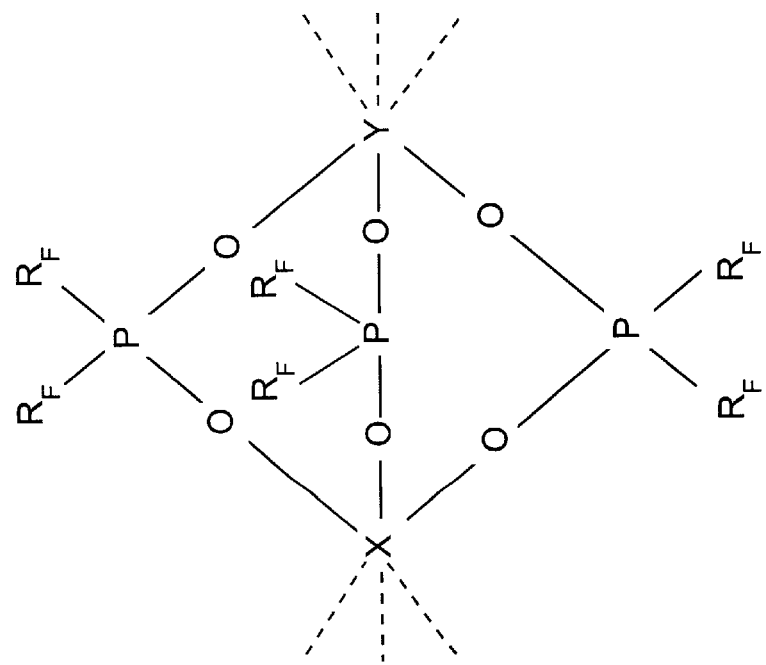
FIG. 4 is a chemical structure of a specific polymer for optical amplification.

Shown in FIG. 4 is an embodiment of a polymer structure. Rare earths X and Y can be for example, erbium and ytterbium, respectively. In this case, the Group $VI_A$ element can be oxygen and the Group $V_A$ element can be phosphorous. In one embodiment, R and R' are fluoroalkyl chains of the general composition $C_xF_{2x+1}$ where x may be 6 or 8.

Manufacture of the present invention will be clarified in an embodiment of Example 1, which is intended to be purely exemplary of the present invention. The invention is not limited to the method described below, but encompasses other methods which produce the resultant product.

EXAMPLE 1

The polymer is formed with a sodium salt having a general composition of,

$$3(n+m)RR'PDDNa \qquad (4)$$

where n and m are positive integers, D at least one of the elements of Group $VI_A$, P is at least phosphorous, R and R' are each a fully halogenated group. In general, "n" and "m" can be between and include, 0 and 50. In certain embodiments, the polymer is formed through the reactions describe in schematic (5),

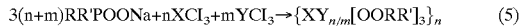
$$3(n+m)RR'POONa+nXCl_3+mYCl_3 \rightarrow \{XY_{n/m}[OORR']_3\}_n \qquad (5)$$

where n and m are positive integers, P is phosphorous and X and Y are rare earths. R and R are chosen from alkyl, alkoxy, alkyl amino and aliphatic cyclic structures. In certain embodiments, the same reaction can hold when the oxygens are replaced by sulfur, $XCl_3$ is a first rare earth chloride, and $YCl_3$ is a second rare earth chloride or aluminum chloride.

In certain embodiments, the reaction for forming a 1:10 $Er^{3+}:Yb^{3+}$ polymer according to the reaction,

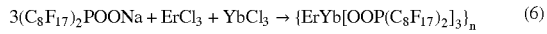
$$3(C_8F_{17})_2POONa + ErCl_3 + YbCl_3 \rightarrow \{ErYb[OOP(C_8F_{17})_2]_3\}_n \qquad (6)$$

$$M_w = 924 \quad M_w = 273.6 \quad M_w = 279.40$$

is as follows. To a $ErCl_3:YbCl_3$ mixture in 0.25 milliliters of a first solvent such as dry acetone, a sodium salt of perfluorophosphinic acid in 3.5 milliliters of acetone is added. The solid formed is stirred under nitrogen for approximately 72 hours at room temperature, or about 22° C. Distilled water is added to the reaction mixture. The resulting solution is boiled to remove the sodium chloride. The resulting solution is filtered and washed with boiling water several times. The product is dried in a vacuum oven, resulting in a yield of 165 milligrams (about 60%). Yields of up to 87% have been achieved.

Although the product formed by the process described above was formed by stirring the solid for approximately 72 hours, those skilled in the art will recognize that the product may be stirred for a period of less than or greater than 72 hours, such as, for example, between 70 and 75 hours. Further, although the product formed by the process described above was stirred at a temperature of approximately 22° C., those skilled in the art will recognize that the product can be formed at a temperature less than or greater than 22° C., such as, for example, between 20° C. and 25° C.

Figure 6:
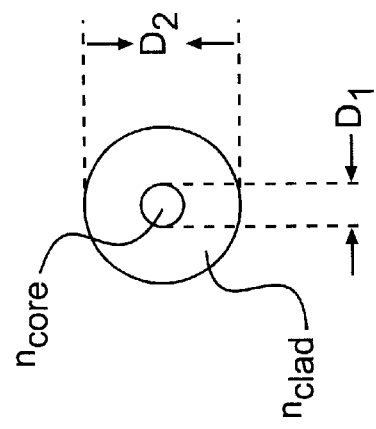
FIG. 6 is an end view of an optical fiber showing relative diameters of the core and cladding.
Figure 5:
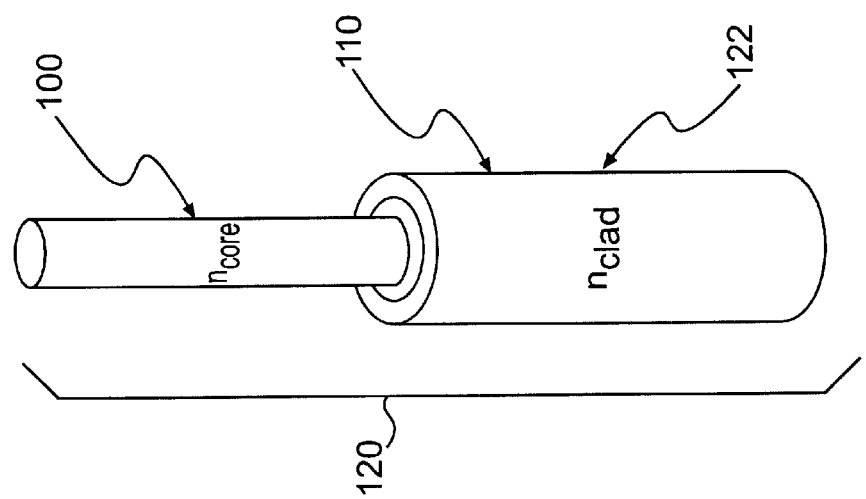
FIG. 5 is a perspective view of an optical fiber with cladding partially stripped away.

In certain embodiments of the present invention, a fiber can be formed from the polymer. Referring to FIG. 5, the polymer or a blend of the polymer with other suitable polymers, such as perfluoropolymers, can be formed into a cylindrical rod 100 of first diameter D, and length for example, by molding or extrusion processes. The rod 100 has a first refractive index. The rod 100 can be inserted into cladding in the form of a tube 110 of a second, lower refractive index material that has a similar processing temperature and closely matched mechanical properties. The tube 110 has a second diameter $D_2$. As shown in FIG. 6, second diameter $D_2$ is greater than first diameter $D_1$ and $D_2$ has a refractive index $n_{clad}$ and $D_1$ has a refractive index $n_{core}$. Preferably, the second diameter $D_2$ is at least two times larger than the first diameter $D_1$ for multimode fibers and fifteen times larger for single mode fibers. The tube 110 can be formed from a polymer similar to the polymer which forms rod 100 with a general composition $\{X'Y'[DDZRR']_3\}_n$, wherein X' and Y' are rare earth elements from the group consisting of lanthanum, cerium, praseodymium, neodymium, promethium, samarium, europium, gadolinium, terbium, dysprosium, holmium, erbium, thulium, ytterbium, lutetium and aluminum, and are different from X. The refractive index $n_{clad}$ of tube 110 being less than the refractive index $n_{core}$ of rod 100.

Figure 7:
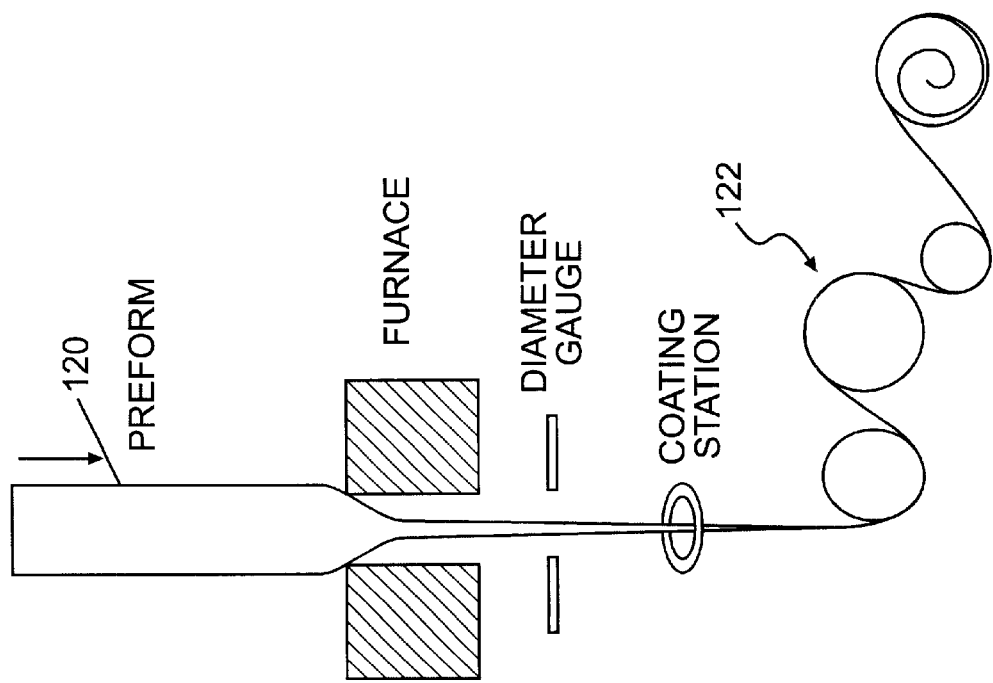
FIG. 7 is a diagram of a polymer fabrication technique.

In certain embodiments, the insertion of the rod 100 into the tube 110 forms a rod and tube assembly 120. In an embodiment, the resulting rod and tube assembly 120 can be for example, a fiber preform, from which single mode optical fiber can be drawn by standard techniques, such as by melt drawing, although those skilled in the art will recognize that other drawing techniques can be employed, and that the preferred technique is not meant to be limiting. For example, see FIG. 7. The fiber 122 which is formed from the rod and tube assembly 120 is then installed in an optical amplifier module (not shown) which comprises at least one, and preferably, several, optical isolators to prevent back reflections, at least one, and preferably, several, wavelength division multiplexers to combine pump and signal light, a pump laser and other optical components. Signal light injected into the module will experience gain in traversing the fiber 122 by transfer of energy from the absorbing ion to the emitting ion and subsequent stimulated emission from the emitting ion. An energy transfer chart is shown in FIG. 1.

Figure 8:
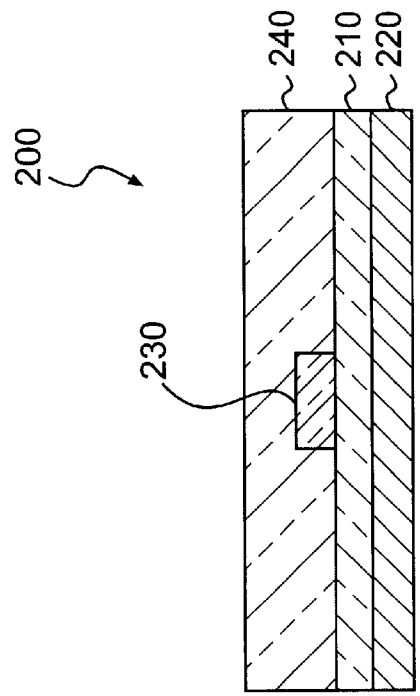
FIG. 8 is a side view, in section of a waveguide.

In certain embodiments, waveguide 200 as shown in FIG. 8 can also be formed from the polymer or a blend of the polymer with other suitable polymers, such as perfluoropolymers. In certain embodiments, the polymer or a blend of the polymer with other polymers can be dissolved in a high boiling point solvent suitable for spin coating or casting. Such a solvent is FC-40 or FC-75, although those skilled in the art will recognize that other suitable solvents can be used. As shown in FIG. 8, a bottom cladding material 210 with a refractive index lower than the refractive index of the polymer 230 can be originally deposited on a waveguide substrate 220. Next, as shown in FIG. 8 a layer of the core polymer 230 can be deposited onto the bottom cladding material 210, for example by spin coating, although those skilled in the art will recognize that other methods can be used. A photoresist layer can be deposited over the predetermined portions of the core polymer 230. The portions of the polymer not covered by the photoresist layer are etched away from the waveguide 200 by known methods. The photoresist can be removed from the waveguide 200 by known method, such as by using a solution to form core 230. As shown in FIG. 8, the waveguide 200 can be overclad with a top cladding material 240 comprising a refractive index lower than the refractive index of the polymer. In certain embodiments, the bottom cladding material can be a refractive index approximately equal to the refractive index of the top cladding material 240. Also in certain embodiments the bottom cladding material 210 and the top cladding material 240 can be comprised of the same material, although those skilled in the art will recognize that different materials can be used. In an embodiment, a resulting waveguide 200 can comprise amplifying properties similar to that of an optical fiber and may be inserted into the optical amplifier module as described above. In certain embodiments, the waveguide 200 can integrate other functions such as optical splitting, switching, modulation and the like, which are known to those skilled in the art.

In an embodiment, a formula for manufacturing the polymer can be as follows:

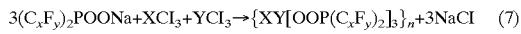

$$3(C_xF_y)_2POONa+XCl_3+YCl_3 \rightarrow \{XY[OOP(C_xF_y)_2]_3\}_n+3NaCl \quad (7)$$

A procedure for making the sodium salt of the perfluoroalkylphosphinic acid can be as follows. To the acid in methanol was added sodium hydroxide in water. The pH of the resulting solution was adjusted to approximately 7.0. The solution can be stirred at room temperature (approximately 20 to 23 degrees C.) for approximately 48 hours to ensure completion of the reaction. The solution was filtered to remove any sediment. The filtrate was evaporated on a warm hot plate to yield a white solid.

The general procedure for making the perfluoropolymer can be as follows. To the anhydrous rare earth chloride in acetone was added the sodium salt made by the process described above in a solvent, for example, acetone. The solid formed was stirred under nitrogen at room temperature for approximately between 48 and 72 hours. Afterward, the solid can be treated with hot (at least 80–95 degrees C.) deionized or distilled water to remove any sodium chloride formed. The remainder was filtered and washed with the hot deionized water and dried in a vacuum oven for approximately 16 hours.

Polymers of the general formula

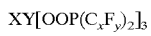

$$XY[OOP(C_xF_y)_2]_3$$

(where y=2x+1) were formed with the elements and ratios listed in Table 1.

TABLE 1

| X | Y | $C_x$ | $F_y$ | Ratio X:Y (by wt) |
|---|---|---|---|---|
| Er | Yb | 8 | 17 | 1:10 |
| Er | Yb | 8 | 17 | 1:1 |
| Er | Yb | 8 | 17 | 1:3 |
| Er | Yb | 8 | 17 | 1:50 |
| Dy | Yb | 8 | 17 | 1:10 |
| Er | Al | 8 | 17 | 1:10 |
| Pr | Yb | 8 | 17 | 1:10 |
| Er | Yb | 6 | 13 | 1:1 |
| Er | Yb | 6 | 13 | 1:10 |
| Er | — | 8 | 17 | — |
| Er | — | 6 | 13 | — |
| Pr | — | 8 | 17 | — |
| Nd | — | 8 | 17 | — |
| Tm | — | 8 | 17 | — |
| Dy | — | 8 | 17 | — |
| Ho | — | 8 | 17 | — |
| Tb | — | 8 | 17 | — |

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A polymer comprised of a general composition $\{XY[DDZRR']_3\}_n$, where:
   X is a first rare earth element;
   Y is a second rare earth element;
   D is one of the elements of Group $VI_A$;
   Z is one of the elements of Group $V_A$;
   R is a first fully halogenated organic group;
   R' is a second fully halogenated organic group; and
   n is an integer greater than 1.

2. The polymer according to claim 1, wherein X is selected from the group consisting of lanthanum, cerium, praseodymium, neodymium, promethium, samarium, europium, gadolinium, terbium, dysprosium, holmium, erbium, thulium, ytterbium, and lutetium.

3. The polymer according to claim 1, wherein Y is selected from the group consisting of lanthanum, cerium, praseodymium, neodymium, promethium, samarium, europium, gadolinium, terbium, dysprosium, holmium, erbium, thulium, ytterbium, and lutetium.

4. The polymer according to claim 1, wherein X and Y are different rare earth elements.

5. The polymer according to claim 1, wherein R and R' are fluoroalkyl chains of a general composition $C_xF_{2x+1}$ where $x \geq 1$.

6. The polymer according to claim 5, wherein x=6.

7. The polymer according to claim 5, wherein x=8.

8. The polymer according to claim 5, wherein R and R' are perfluoroalkyls.

9. The polymer according to claim 5, wherein R R'.

10. The polymer according to claim 5, wherein R equals R'.

11. The polymer according to claim 1, wherein the polymer is soluble in at least one of a plurality organic solvents.

12. The polymer according to claim 7, wherein the at least one of the plurality of organic solvents comprises dimethyl acetamide.

13. The polymer according to claim 1, wherein each of the first and second fully halogenated organic groups consists of at least one of the group of fluorine, chlorine, bromine, and mixtures thereof.

14. The polymer according to claim 9, wherein each of the first and second fully halogenated organic groups consists of fluorine.

15. The polymer according to claim 1, wherein a ratio of X to Y by weight is approximately one to one.

16. The polymer according to claim 1, wherein a ratio of X to Y by weight is approximately three to one.

17. The polymer according to claim 1, wherein a ratio of X to Y by weight is between approximately 1 to 1 and 1 to 50.

18. The polymer according to claim 1, wherein the ratio of X to Y by weight is approximately 1 to 10.

19. The polymer according to claim 1, wherein D is one of oxygen and sulfur.

20. The polymer according to claim 1, wherein Z is one of nitrogen and phosphorous.

21. A method of manufacturing a polymer comprising:
   providing a sodium salt of a fully halogenated substituted acid in liquid acetone, the sodium salt having a general composition 3(n+m)RR'ZDDNa, wherein:
   n and m are positive integers;

D is one of the elements of Group $VI_A$;
Z is one of the elements of Group $V_A$;
R is a first fully halogenated organic group; and
R' is a second fully halogenated organic group;
providing a first rare earth chloride $XCI_3$ in dry acetone, wherein X is selected from the group consisting of lanthanum, cerium, praseodymium, neodymium, promethium, samarium, europium, gadolinium, terbium, dysprosium, holmium, erbium, thulium, ytterbium, and lutetium;
providing a second rare earth chloride $YCI_3$ in dry acetone, wherein Y is selected from the group consisting of lanthanum, cerium, praseodymium, neodymium, promethium, samarium, europium, gadolinium, terbium, dysprosium, holmium, erbium, thulium, ytterbium, and lutetium;
combining the sodium salt in the liquid acetone, the first rare earth chloride in the dry acetone, and the second rare earth chloride in the dry acetone together to form a mixture;
stirring the mixture under nitrogen for a predetermined period of time at a predetermined temperature;
adding distilled water to the mixture;
boiling the aqueous solution;
filtering the aqueous solution; washing the aqueous solution with boiling water, forming a washed product; and drying the washed product.

22. The method according to claim 21, wherein the stirring is performed for between 70 and 75 hours.

23. The method according to claim 21, wherein the stirring is performed at between 20° C. and 25° C.

24. The method according to claim 21, wherein the drying is performed in a vacuum oven.

25. The method according to claim 21, wherein the drying yields at least 60% of polymer.

26. A polymer comprised of a general composition $\{XY[DDZRR']_3\}_n$, where:
X is a first rare earth element;
Y is a second rare earth element;
D is one of the elements of Group $VI_A$;
Z is one of the elements of Group $V_A$;
R is a first fully halogenated organic group;
R' is a second fully halogenated organic group; and
n is an integer greater than 1;
the polymer being formed by:
providing a sodium salt of a fully halogenated substituted acid in liquid acetone, the sodium salt having a general composition 3(n+m)RR'ZDDNa, wherein:
n and m are positive integers;
D is one of the elements of Group $VI_A$;
Z is one of the elements of Group $V_A$;
R is a first fully halogenated organic group; and
R' is a second fully halogenated organic group;
providing a first rare earth chloride $XCI_3$ in dry acetone, wherein X is selected from the group consisting of lanthanum, cerium, praseodymium, neodymium, promethium, samarium, europium, gadolinium, terbium, dysprosium, holmium, erbium, thulium, ytterbium, and lutetium;
providing a second rare earth chloride $YCI_3$ in dry acetone, wherein Y is selected from the group consisting of lanthanum, cerium, praseodymium, neodymium, promethium, samarium, europium, gadolinium, terbium, dysprosium, holmium, erbium, thulium, ytterbium, and lutetium;
combining the sodium salt in the liquid acetone, the first rare earth chloride in the dry acetone, and the second rare earth chloride in the dry acetone together to form a mixture;
stirring the mixture under nitrogen for a predetermined period of time at a predetermined temperature;
adding distilled water to the mixture;
boiling the aqueous solution;
filtering the aqueous solution;
washing the aqueous solution with boiling water, forming a washed product; and
drying the washed product.

27. An optical amplifying fiber assembly comprising:
a fiber formed from a first polymer as claimed in claim 1, the fiber having a first diameter and a first refractive index; and
a cladding disposed about an outer perimeter of the fiber, the cladding having a diameter and a second refractive index less than the first refractive index.

28. The optical amplifying fiber assembly according to claim 27, wherein the cladding comprises a second polymer.

29. The optical amplifying fiber assembly according to claim 28, wherein the second polymer has a general composition $\{X'Y'[DDZRR']_3\}_n$, where:
X' is a third rare earth element different from X;
Y' is a fourth rare earth element different from X;
D is one of the elements of Group $VI_A$;
Z is one of the elements of Group $V_A$;
R is a first fully halogenated organic group;
R' is a second fully halogenated organic group; and
n is an integer greater than 1.

30. The optical amplifying fiber assembly according to claim 28, wherein the second diameter is at least two times larger than the first diameter.

31. The optical amplifying fiber assembly according to claim 27, further comprising a second polymer blended with the first polymer.

32. An optical waveguide comprising:
a substrate;
a first cladding layer disposed on the substrate, the first cladding layer having a first refractive index;
a first polymer as claimed in claim 1 being disposed on the first cladding layer, the first polymer having a second refractive index;
a plurality of channel waveguides formed in the first polymer; and
a second cladding layer disposed over the first polymer, the second cladding layer having a third refractive index,
wherein the first and third refractive indices being less than the second refractive index.

33. The optical waveguide according to claim 32, wherein the first refractive index is approximately equal to the third refractive index.

34. The optical waveguide according to claim 32, further comprising a second polymer blended with the first polymer.

35. The optical waveguide according to claim 32, wherein the first polymer is disposed on the first cladding layer by spin coating the first polymer onto the first cladding layer.

* * * * *

UNITED STATES PATENT AND TRADEMARK OFFICE
CERTIFICATE OF CORRECTION

PATENT NO. : 6,538,805 B1
DATED : March 25, 2003
INVENTOR(S) : Norwood et al.

It is certified that error appears in the above-identified patent and that said Letters Patent is hereby corrected as shown below:

Column 12,
Line 35, change "R R'" to -- R does not equal R' --.
Line 39, after "plurality" insert -- of --.

Column 13,
Lines 5 and 57, change "$XCI_3$" to -- $XCl_3$ --.
Lines 11 and 63, change "$YCI_3$" to -- $YCl_3$ --.
Lines 38-39, change "$\{XY[DDZRR']_3\}_n$," to -- $\{XY[DDZRR']_3\}_n$, --.

Signed and Sealed this

Eighth Day of July, 2003

JAMES E. ROGAN
*Director of the United States Patent and Trademark Office*